United States Patent
Dupuy et al.

(10) Patent No.: US 7,460,562 B2
(45) Date of Patent: Dec. 2, 2008

(54) UPLINK FRAME AT THE TRANSCODER RATE ADAPTATION UNIT/BASE TRANSCEIVER STATION INTERFACE IN A CELLULAR MOBILE RADIO NETWORK

(75) Inventors: Pierre Dupuy, Paris (FR); Laurent Cruchant, Rueil Malmaison (FR)

(73) Assignee: Alcatel N.V., Rijswijk (NL)

( * ) Notice: Subject to any disclaimer, the term of this patent is extended or adjusted under 35 U.S.C. 154(b) by 647 days.

(21) Appl. No.: 08/498,749

(22) Filed: Jul. 6, 1995

(65) Prior Publication Data

US 2003/0067893 A1    Apr. 10, 2003

(30) Foreign Application Priority Data

Jul. 11, 1994 (FR) .................................. 94 08544

(51) Int. Cl.
  *H04J 3/12* (2006.01)
  *H04J 3/16* (2006.01)
  *H04B 7/212* (2006.01)
  *H04L 12/43* (2006.01)

(52) U.S. Cl. ..................... 370/522; 370/345; 370/442; 370/458

(58) Field of Classification Search ............... 370/84, 370/112, 95.1, 95.3, 110.1, 110.4, 79, 82, 370/83, 105.1, 337, 347, 522, 458, 459, 345, 370/422, 465, 468; 379/59, 60, 61, 63; 455/33.1, 455/33.4, 54.1

See application file for complete search history.

(56) References Cited

U.S. PATENT DOCUMENTS

| | | | | |
|---|---|---|---|---|
| 5,260,987 A | * | 11/1993 | Mauger | 379/59 |
| 5,430,774 A | * | 7/1995 | Dupuy | 370/105.1 |
| 5,436,900 A | * | 7/1995 | Hammar et al. | 370/118 |
| 5,438,569 A | * | 8/1995 | Kapadia et al. | 370/95.1 |
| 5,457,701 A | * | 10/1995 | Wasilewski et al. | 714/776 |
| 5,475,686 A | * | 12/1995 | Bach et al. | 370/112 |
| 5,712,850 A | * | 1/1998 | Elia et al. | 370/326 |

FOREIGN PATENT DOCUMENTS

| | | |
|---|---|---|
| EP | 0600773 A1 | 6/1994 |
| FR | 2700088 A1 | 7/1994 |

OTHER PUBLICATIONS

GSM Recommendation 08.60 Version 3.1.0, Jun. 1989.*
Mouly et al, "The GSM System foro Mobile Communications", 1992, *Europe Media*, Lassay-Les Chateaux, France.

* cited by examiner

*Primary Examiner*—Ronald Abelson
(74) *Attorney, Agent, or Firm*—Sughrue Mion, PLLC

(57) ABSTRACT

An uplink transmission frame transmitted from a base transceiver station to a transcoder rate adaptation unit in a cellular mobile radio network includes in the conventional way an information area in the form of at least one data field and at least one control field, the latter including a subfield representative of the validity of data transmitted in the at least one data field. This subfield is substantially at the start of the information area. This frame structure prevents transmission of invalid speech signals during a call from the cellular network to a fixed network such as the public switched telephone network at the time of handover affecting a mobile station involved in the call.

14 Claims, 4 Drawing Sheets

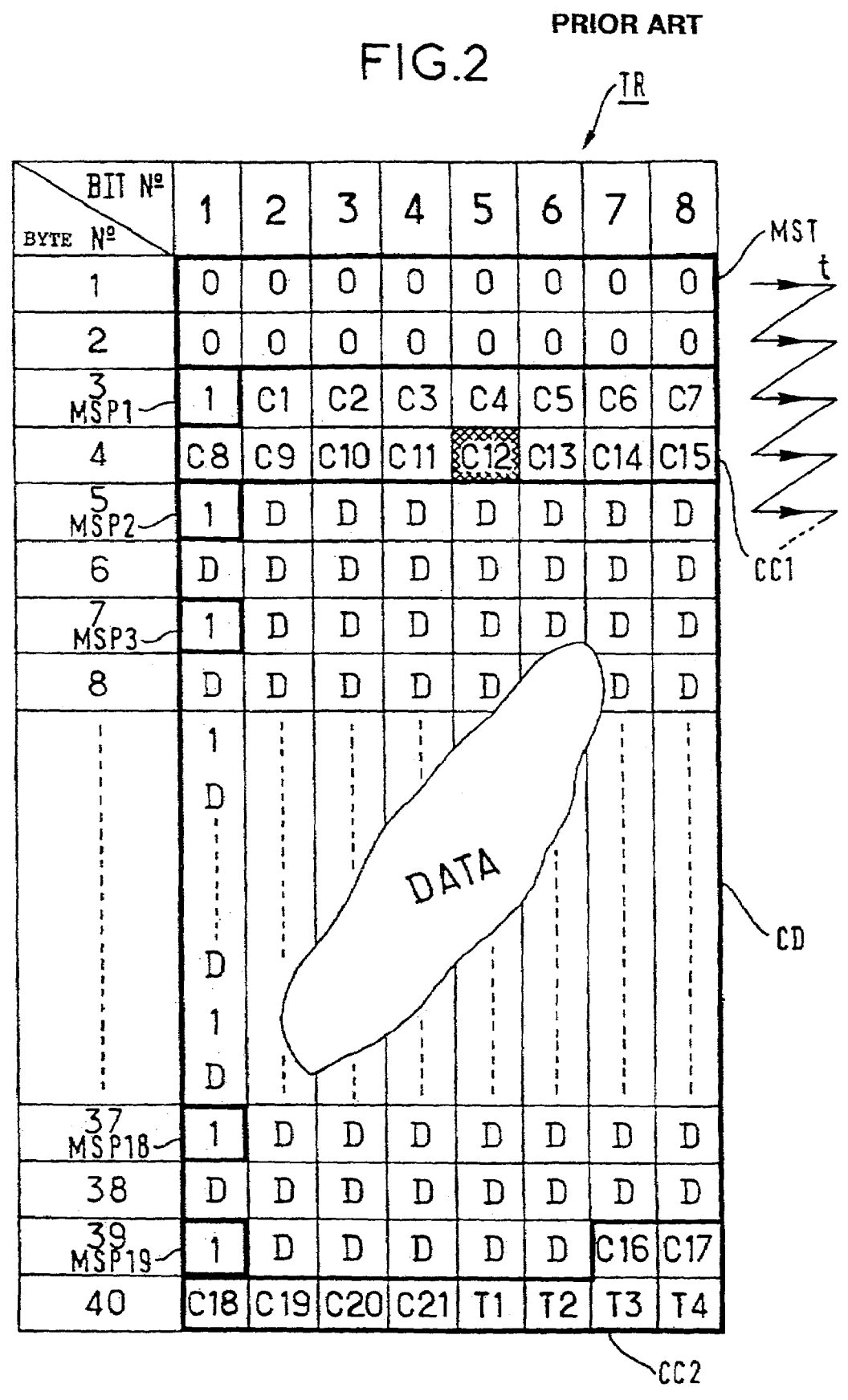

PRIOR ART

FIG.2

| BIT N°<br>BYTE N° | 1 | 2 | 3 | 4 | 5 | 6 | 7 | 8 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 MSP1 | 1 | C1 | C2 | C3 | C4 | C5 | C6 | C7 |
| 4 | C8 | C9 | C10 | C11 | C12 | C13 | C14 | C15 |
| 5 MSP2 | 1 | D | D | D | D | D | D | D |
| 6 | D | D | D | D | D | D | D | D |
| 7 MSP3 | 1 | D | D | D | D | D | D | D |
| 8 | D | D | D | D | D | D | D | D |
| ⋮ | 1<br>D<br>⋮<br>D<br>1<br>D | | | | | | | |
| 37 MSP18 | 1 | D | D | D | D | D | D | D |
| 38 | D | D | D | D | D | D | D | D |
| 39 MSP19 | 1 | D | D | D | D | D | C16 | C17 |
| 40 | C18 | C19 | C20 | C21 | T1 | T2 | T3 | T4 |

UPLINK FRAME AT THE TRANSCODER RATE ADAPTATION UNIT/BASE TRANSCEIVER STATION INTERFACE IN A CELLULAR MOBILE RADIO NETWORK

BACKGROUND OF THE INVENTION

1. Field of the Invention

The present invention is generally concerned with an uplink frame at the transcoder rate adaptation unit (TRAU)/base transceiver station (BTS) interface in a cellular mobile radio network. In this type of network the uplink frame is transmitted by a BTS to a TRAU, and the invention also concerns a BTS for producing a frame of this kind.

2. Description of the Prior Art

The limited frequency bandwidth available in mobile radio networks necessitates the processing, or coding, of speech signals to reduce the bit rate. In a fixed network such as the public switched telephone network (PSTN) the bit rate on a PCM multiplex channel is typically 64 kbit/s in the case of a call that has been set up. To reduce this bit rate the GSM (Global System for Mobile communications) network uses speech signal processing by an RPE-LPT (Regular Pulse Excitation, Long Term Prediction) coder to yield a processed segment of 260 samples representing 20 ms of speech and defining a bit rate of 13 kbit/s. A speech channel received from the PSTN at 64 kbit/s is therefore processed by the GSM network to produce a speech channel at 13 kbit/s and, conversely, a speech signal at 13 kbit/s received from a mobile station is processed in the GSM mobile network to provide a 64 kbit/s channel into the PSTN. In a GSM network of this kind the functional entity which converts 64 kbit/s speech channels into 13 kbit/s channels and vice versa is the TRAU.

FIG. 1 is a diagrammatic representation of a transmission system using the architecture of the GSM mobile network. It includes in a cascade arrangement a mobile services switching center (MSC), a TRAU 1, a base station controller (BSC) 2, two BTS 30 and 31 and mobile stations (MS) 4. The TRAU 1 is connected to the BSC 2 by a link 2*a* and the BSC 2 is connected to the two BTS 30 and 31 by respective links 30*a* and 31*a*. As already explained, the TRAU 1 processes data (e.g. speech) channels at 64 kbit/s to produce 13 kbit/s channels and vice versa. It receives from and transmits to the PSTN, via the MSC, 64 kbit/s multiplexed data channels carried by a transmission link 1*a*. It transmits to and receives from the BTS 30 and 31, via the BSC 2, 16 kbit/s frames TR.

In a TR frame the wanted data, such as the speech signal for a call setup to a mobile station 4, defines a bit rate of 13 kbit/s within the overall bit rate of 16 kbit/s of the frame, the remaining 3 kbit/s being used to transmit synchronization and control signals between the BTS 30, 31 and the TRAU 1.

In the uplink direction from the mobile station 4 to the PSTN these uplink frames TR are produced by a BTS 30 or 31 from 13 kbit/s speech data received from a mobile station. The BTS 30 or 31 inserts the synchronization and control signals accounting for 3 kbit/s to form each 16 kbit/s uplink frame TR from the speech sector accounting for 13 kbit/s. The uplink frames TR are received by the TRAU 1 which subtracts the synchronization and control signals inserted by the BTS 30, 31 and converts the resulting 13 kbit/s speech signal into a 64 kbit/s signal transmitted to the PSTN.

In the downlink direction from the PSTN to a mobile station 4 the TRAU 1 inserts synchronization and control signals to form downlink frames at 16 kbit/s from the stream of wanted data at 13 kbit/s. This stream results from processing by the TRAU 1 of a 64 kbit/s speech signal received from the PSTN. The downlink frames TR are received by the BTS 30, 31 concerned which subtracts the synchronization and control signals inserted by the TRAU 1 and transmits in a communication channel set up to the mobile station 4 via an antenna 30*b*, 31*b* only the speech data signals.

As shown in FIG. 2, each uplink frame TR transmitted from a BTS 30 or 31 to the TRAU 1 includes 8×40=320 bits defining 20 ms of speech. As specified in ETSI Recommendation (European Digital Cellular Telecommunications System/Inband Control of Remote Transcoders and Rate Adapters, October 1993), the uplink frame includes, firstly, a wanted information field in the form of a first control field CC1, a plurality of data fields CD and a second control field CC2, and, secondly, a frame synchronization pattern MST and 19 periodic synchronization patterns MSP1 through MSP19 between two successive data fields.

The top line and the lefthand column in the FIG. 2 table give, for a given bit in the frame, the number (1 through 40) of the byte including that bit and the number of said bit within that byte.

The frame synchronization pattern MST occupies the first two bytes (bytes 1 and 2) of the frame TR and comprises 2×8=16 bits at "0", the "0" state being called the first state. The periodic synchronization patterns MSP1 through MSP19 each comprise a bit at "1", the "1" state being called the second state, and each occupies a respective bit of an odd-numbered byte in the frame, starting at byte 3. Accordingly, the synchronization pattern MSP1 occupies the first bit of byte 3, the synchronization pattern MSP2 occupies the first bit of byte 5, and so on recurrently up to synchronization pattern MSP19 which occupies the first bit of byte 39. The control field CC1 comprises 15 bits C1 through C15 and occupies the third and fourth bytes of the frame TR, except for the first bit of the third byte (byte 3), carrying the pattern MSP1.

The control field CC2 comprises six bits C16 through C21 and occupies the last two bits of byte 39 and first four bits of byte 40. The bits in the control fields CC1 and CC2 define the frame type (speech) and the channel type (bit rate, etc) and also carry time alignment information, etc.

In the context of the invention, the emphasis is on the control bit C12 carried in a subfield of control field CC1 and shown shaded within field CC1. In the prior art, this bit represents a bad frame indication representative of the validity of the data D transmitted in the data fields CD.

In an uplink frame TR, a BTS 30 or 31 sets this bit C12 to "1" or "0" to tell the TRAU 1 that said frame TR carrying this bit C12 is a bad frame or a good frame, respectively. The TRAU 1 includes means for applying specific processing if the uplink frame TR is indicated as a bad frame, which avoids the generation of 20 ms of invalid speech signal that would otherwise be transmitted at 64 kbit/s to the PSTN. The bit C12 is inserted into the uplink frame TR by a channel codec unit (CCU) in the BTS 30 or 31 that produced the frame.

Referring again to FIG. 1, at the time of a change of cell (internal handover) in response to a mobile station (MS) 4 crossing the imaginary boundary B between two cells with which the respective BTS 30 and 31 are associated, it can be seen that the location of the prior art bad frame indication bit C12 is less than optimal and leads to the risk of incorrect interpretation of data bits by the TRAU 1. To explain this, it is assumed (for example) that prior to the handover the mobile 4 is connected to the BTS 30 which produces the uplink frames TR to the TRAU 1 and that after handover the mobile station 4 is connected to the BTS 31 which produces the uplink frames relating to the call set up with the mobile station transmitted to the TRAU 1. The "source" BTS 30 and the "target" BTS 31 are not synchronized in terms of frequency or time in connection with the frames transmitted. During handover, the TRAU 1 therefore receives a first frame TR portion transmitted by the source BTS 30 and a second frame TR portion transmitted by the target BTS 31. If handover occurs after the synchronization pattern MST and before bit C12, relative to the first frame transmitted by the source BTS 30, there is a high probability that a bit of the second frame transmitted by the target BTS 31 and interpreted by the TRAU 1 as bit C12 of the first frame will assume a "0" state indicating to the TRAU 1 that the frame received is good, whereas it is in fact bad. On the other hand, the bit C12 transmitted by the source BTS 30 and indicating a bad frame is not received by the TRAU 1.

Thus, in the prior art, the uplink frame structure defined at the TRAU/BTS interface is less than optimal in connection with internal handover between two BTS using the same TRAU. With this frame structure, a frame can be indicated to the TRAU as "good" during handover whereas it is in fact "bad".

The invention is directed to overcoming the aforementioned drawback by providing an uplink frame at the BTS/TRAU interface that makes such incorrect interpretation of the bad frame information by the TRAU virtually impossible.

SUMMARY OF THE INVENTION

The invention consists in a frame comprising an information area in the form of at least one data field and at least one control field, the control field including substantially at the start of the information area a subfield representative of the validity of data transmitted in the data field.

The information area is preferably preceded in the frame by a frame synchronization pattern.

A plurality of synchronization patterns may appear periodically in the frame.

In a first variant of the invention, based on the previously mentioned Recommendation GSM-08.60, the subfield representative of the validity of the data transmitted in the at least one data field is in the form of a single bit taking one of two states and the bit is the first bit of the information area.

In a second variant the subfield representative of the validity of the data transmitted in the at least one data field comprises the first N bits of the information area and at least two respective predetermined combinations of the first N bits indicate the validity or the non-validity of the data transmitted in the at least one data field.

The frame is typically an uplink frame transmitted from a base transceiver station to a transcoder rate adaptation unit in a cellular mobile radio network.

The invention also consists in a transmitter in a mobile radio network for producing a frame in accordance with the invention. The transmitter includes means for multiplexing the at least one data field and said at least one control field adapted to multiplex the subfield at the start of the frame.

The invention further consists in a receiver in a mobile radio network for receiving a frame in accordance with the invention. The receiver includes means for demultiplexing the at least one data field and said at least one control field adapted to demultiplex the subfield at the start of the frame.

Other features and advantages of the present invention will emerge more clearly from a reading of the following description given with reference to the appended drawings.

BRIEF DESCRIPTION OF THE DRAWINGS

FIG. 2, also already commented on, shows a frame structure of the prior art at the TRAU/BTS interface in the cellular network from FIG. 1.

DETAILED DESCRIPTION OF THE PREFERRED EMBODIMENT

Figure 1:
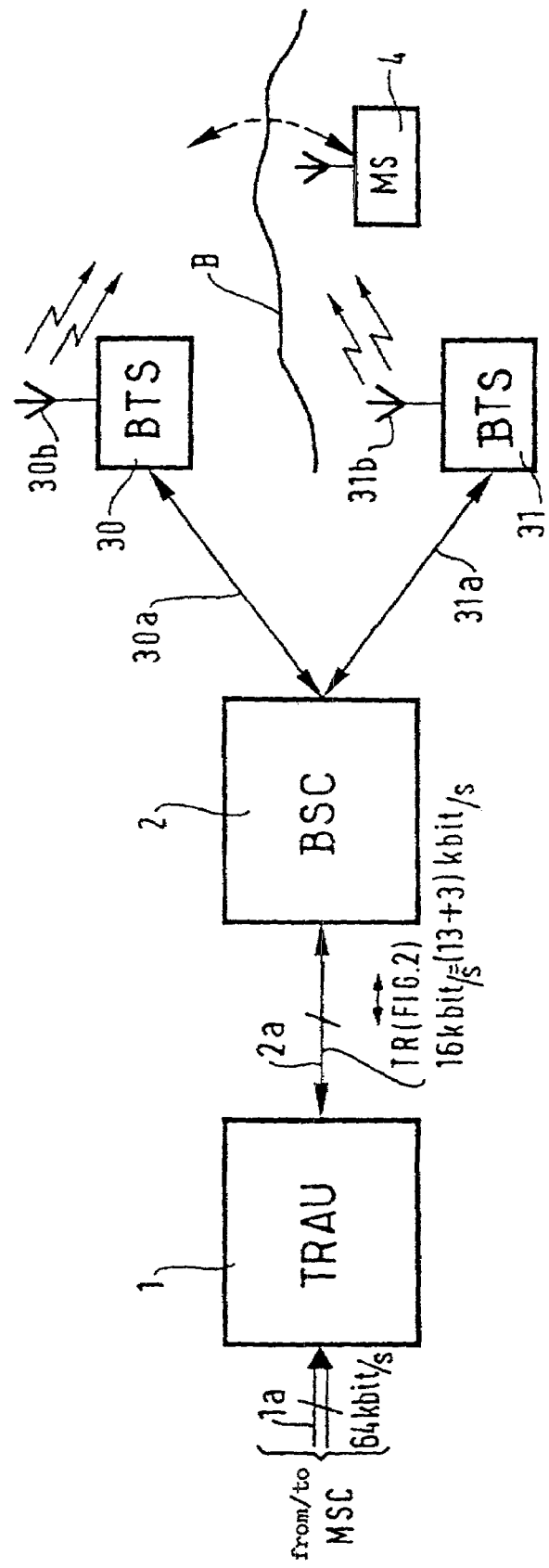
FIG. 1, already commented on, is a diagrammatic representation of a transmission system in the architecture of a cellular mobile radio network.
Figure 3:
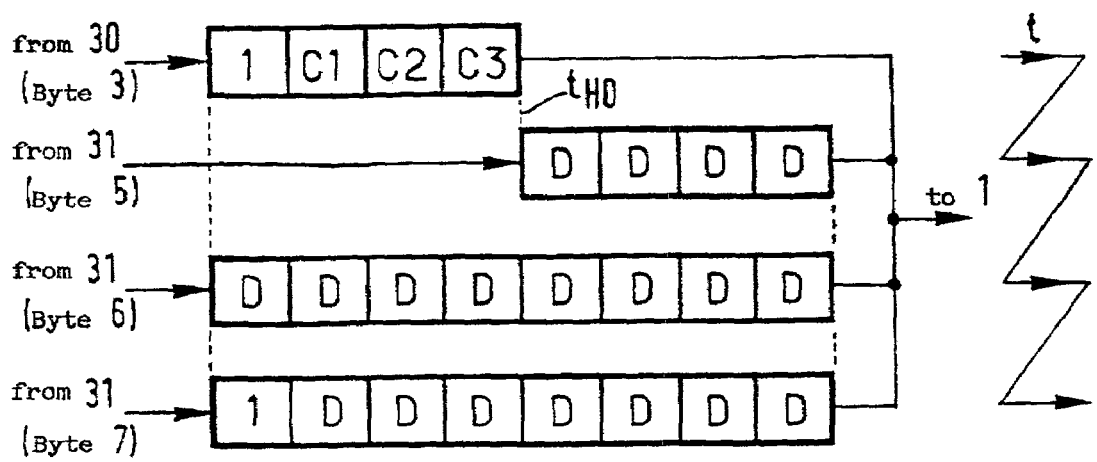
FIG. 3 shows respective portions of first and second frames as received by a prior art TRAU during handover to explain the synchronization error that can occur because of the frame structure shown in FIG. 2.

FIG. 3 is to be read in the following manner, for consistency with the timing conventions selected for FIG. 2, which relates to a frame structure. The time variable increases from left to right and from top to bottom as shown by the zig-zag arrow t on the righthand side of FIG. 3. FIG. 3 is a timing diagram showing the bits successively received by a prior art TRAU 1 before and after handover occurring at time $t_{HO}$. The source and target BTS involved in the handover are respectively BTS 30 and 31. In four successive bit periods, the TRAU 1 receives the first four bits 1, C1, C2 and C3 of byte 3 of a first uplink frame TR (FIG. 2) transmitted by the source BTS 30. Handover occurs at time $t_{HO}$ since, with no discontinuity, the TRAU 1 receives the last four bits of byte 5 of a second uplink frame TR transmitted by the target BTS 31 and the subsequent bytes 6, 7, etc of this same second frame.

Assuming that the fifth bit D of byte 6 transmitted in the second frame is at "0", the TRAU 1 perceives this bit D="0" as a good frame indication bit C12 of the first frame, since it does not detect the transition from the first frame transmitted by the source BTS to the second frame transmitted by the target BTS. Furthermore, in this configuration, which is intentionally an extreme configuration in order to explain the synchronization error made by the TRAU 1, the periodic synchronization patterns MSP3 through MSP19 transmitted in the second frame coincide with those expected by the TRAU 1 in relation to the first frame, and the latter does not detect any loss of synchronization on the basis of these synchronization patterns MSP. The TRAU 1 will detect loss of synchronization only when the target BTS 31 transmits a subsequent frame synchronization pattern MST.

Figure 4:
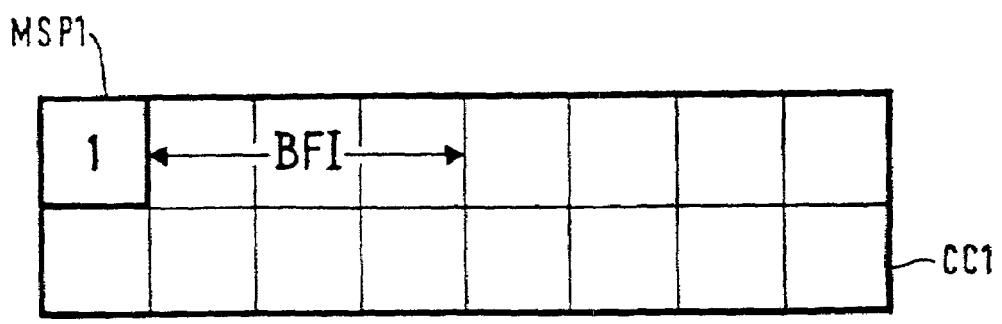
FIG. 4 shows a portion of the frame shown in FIG. 2 corrected in accordance with the invention.

To remedy this the invention uses a frame structure of the type shown in FIG. 2 and therefore including, firstly, a wanted information area in the form of a first control field CC1, data fields CD and a second control field CC2 and, secondly, a frame synchronization pattern MST and 19 periodic synchronization patterns MSP1 through MSP19; the invention places in this frame a subfield carrying the bad frame indication BFI substantially at the start of the control field CC1, i.e. at the start of the wanted information area, as shown in FIG. 4. In a first variant of the invention this subfield comprises the first N bits of the information area. N=3 (for example) and two combinations of the states of these three bits (e.g. "111" and "000") respectively convey an indication that the data transmitted in the frame is valid and an indication that this data is invalid. All other combinations of the states of these N=3 bits form control words each having a different meaning, such as "full rate" for the combination "010" and "half rate" for the combination "011". In practice the number of combinations of states carrying a validity or non-validity indication in respect of the data transmitted in the frame can be greater than 1. In a second variant of the invention, this subfield BFI comprises the first bit of the information area, in which case it conveys the binary information transmitted in the prior art in bit C12. The person skilled in the art will understand that the invention is not strictly limited to the frame structure shown in FIG. 2. Without departing from the scope of the invention, the frame could omit the periodic synchronization patterns MSP and/or frame synchronization patterns MST.

In accordance with the invention, the bad frame indication subfield BFI being substantially at the start of the frame or at the start of the wanted information area if the frame includes frame synchronization patterns MST and/or periodic synchronization patterns MSP, the probability of handover occurring between the end of the pattern MST and the start of the subfield BFI is virtually zero. In the case of the frame structure shown in FIG. 2, for example, modified as shown in FIG. 4, the following two most probable alternatives may occur:

either the TRAU 1 receives the content of the subfield BFI indicating a bad frame prior to handover and in the first frame transmitted by the source BTS, or said TRAU 1 receives at least one bit at "1" after handover in the second frame transmitted by the target BTS which coincides with the frame synchronization bit MST in the first frame, in which case the TRAU 1 detects loss of synchronization.

The only alternative that can cause a synchronization error in the TRAU 1 is if handover occurs before the start of the subfield BFI in the first frame and the data transmitted in the second frame from this time coincides:

firstly, with a final part of the frame synchronization pattern MST expected by the TRAU 1 relative to the first frame, and therefore assuming the "0" state, and secondly, with the information transmitted in the field BFI of the first frame, indicating a good frame.

Figure 5:
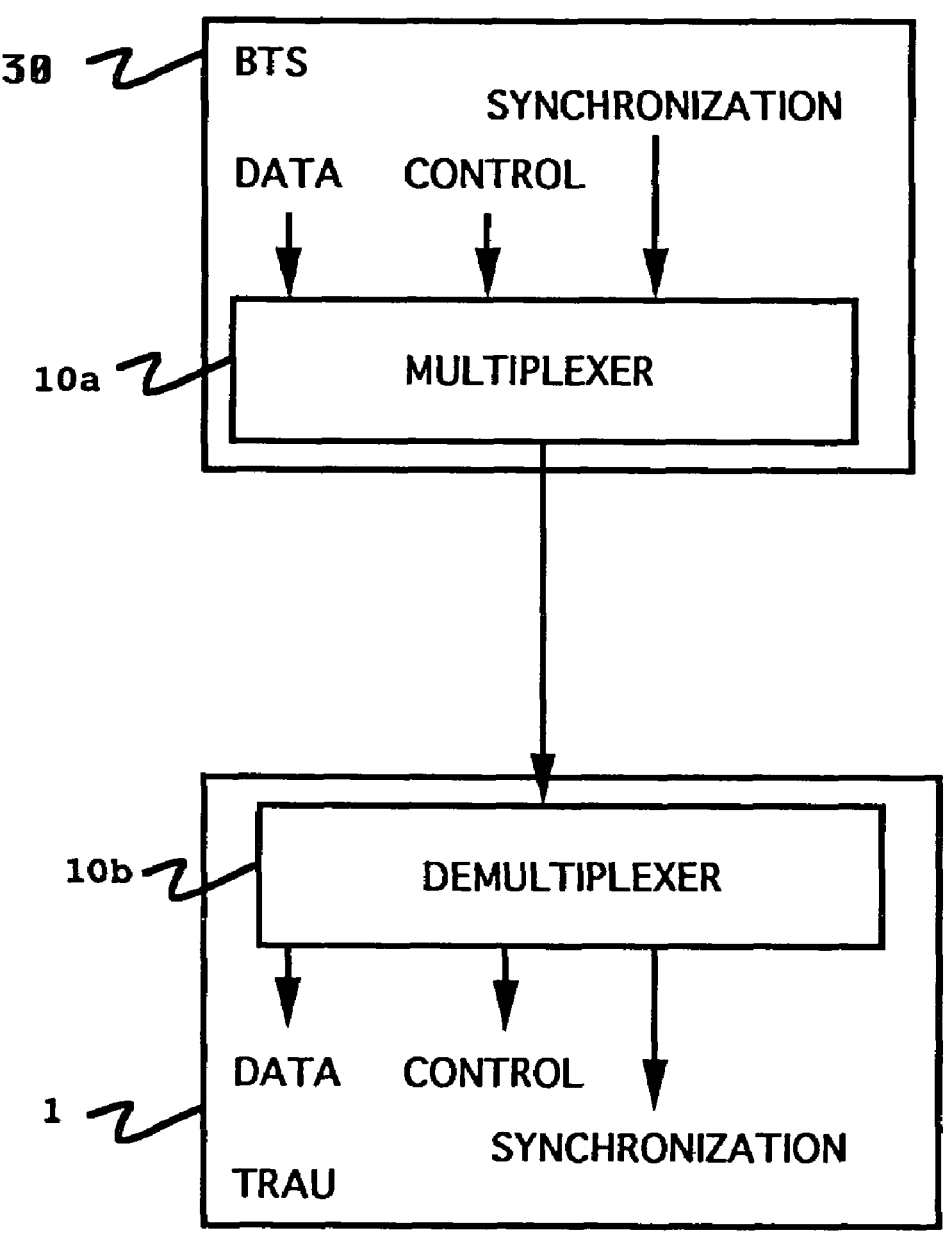
FIG. 5 shows a multiplexer and demultiplexer which can be used to implement the transmission frame according to the present invention.

The invention also provides a BTS (or transmitter) 30, 31 in a mobile radio network for producing a frame TR in accordance with the invention. The BTS includes in the conventional way multiplexing means 10a for multiplexing data fields CD, control fields CC1 and CC2 and synchronization patterns MST and MSP1 through MSP19 e,g, as shown schematically in FIG. 5. In accordance with the invention the multiplexing means 10a multiplex the subfield BFI at the start of the information area in the frame TR. The invention also provides a TRAU (or receiver) for receiving a frame in accordance with the invention. The TRAU includes, in the usual way, demultiplexing means 10b for demultiplexing data fields CD, control fields CC1 and CC2 and synchronization patterns MST and MSP1 through MSP19. In accordance with the invention the demultiplexing means 10b in the TRAU demultiplex the subfield BFI at the start of the information area in the frame TR.

Although the foregoing description is limited to an uplink frame, the only frame which conveys a bad frame indication under Recommendation GSM-08.60, it will be obvious to the person skilled in the art that the frame of the invention can be a downlink frame in a mobile network which supports an indication of this kind in a downlink frame. In this case, and in relation to the architecture of the GSM network, the TRAU is a transmitter of each downlink frame and the BTS is a receiver of each downlink frame.

Although in the foregoing description the subfield BFI is assumed to occupy the first bit or bits of the information area, the person skilled in the art will understand that this subfield BFI can occupy a bit or bits of higher number if the first bits of the information area are allocated to other control words. In accordance with the invention, the number of the first bit of the field BFI is nevertheless lower than 12. In this case the probability that handover will occur between the end of the pattern MST and the start of the subfield BFI is not zero but is nevertheless significantly reduced as compared with the prior art.

As used herein and in the appended claims, a field or subfield which is "substantially at the start of the information area" must have a first bit which occurs earlier than the $12^{12}$ bit of the control field (e.g., CC1) which occurs at the beginning of the information area.

There is claimed:

1. A transmitter in a mobile radio network for producing a transmission frame comprising an information area in the form of at least one data field and at least one control field, said at least one control field including substantially at the start of said information area a subfield representative of the validity of data transmitted in said at least one data field, said transmitter including means for multiplexing said at least one data field and said at least one control field adapted to multiplex said subfield substantially at the start of said information area, said transmission frame corresponding to an uplink frame transmitted from a base transceiver station to a transcoder rate adaptation unit in a cellular mobile radio network, wherein said subfield representative of the validity of the data transmitted in said at least one data field is in the form of a single bit taking one of two states and said bit is the first bit of said information area.

2. A transmitter in a mobile radio network for producing a transmission frame comprising an information area in the form of at least one data field and at least one control field, said at least one control field including substantially at the start of said information area a subfield representative of the validity of data transmitted in said at least one data field, said transmitter including means for multiplexing said at least one data field and said at least one control field adapted to multiplex said subfield substantially at the start of said information area, said transmission frame corresponding to an uplink frame transmitted from a base transceiver station to a transcoder rate adaptation unit in a cellular mobile radio network, wherein said subfield representative of the validity of the data transmitted in said at least one data field comprises the first N bits of said information area and at least two respective predetermined combinations of said first N bits indicate the validity or non-validity of said data transmitted in said at least one data field.

3. A receiver in a mobile radio network for receiving a transmission frame comprising an information area in the form of at least one data field and at least one control field, said at least one control field including substantially at the start of said information area a subfield representative of the validity of data transmitted in said at least one data field, said receiver including means for demultiplexing said at least one data field and said at least one control field adapted to demultiplex said subfield substantially at the start of said information area, said transmission frame corresponding to an uplink frame transmitted from a base transceiver station to a transcoder rate adaptation unit in a cellular mobile radio network, wherein said subfield representative of the validity of the data transmitted in said at least one data field is in the form of a single bit taking one of two states and said bit is the first bit of said information area.

4. A receiver in a mobile radio network for receiving a transmission frame comprising an information area in the form of at least one data field and at least one control field, said at least one control field including substantially at the start of said information area a subfield representative of the validity of data transmitted in said at least one data field, said receiver including means for demultiplexing said at least one data field and said at least one control field adapted to demultiplex said subfield substantially at the start of said information area, said transmission frame corresponding to an uplink frame transmitted from a base transceiver station to a transcoder rate adaptation unit in a cellular mobile radio network, wherein said subfield representative of the validity of the data transmitted in said at least one data field comprises the first N bits of said information area and at least two respective predetermined combinations of said first N bits indicate the validity or non-validity of said data transmitted in said at least one data field.

5. An apparatus for exchanging information between stations, said apparatus comprising at least one of a transmitter and a receiver exchanging said information via a transmission frame containing an information area, said information area including at least one data field and at least one control field, said at least one control field including a subfield representative of the validity of data transmitted in said at least one data field, said subfield being substantially at the start of the information area, the transmission frame corresponding to an uplink frame transmitted from a base transceiver station to a transcoder rate adaptation unit in a cellular mobile radio network, wherein said subfield representative of the validity of the data transmitted in said at least one data field is in the form of a single bit taking one of two states and said bit is the first bit of said information area.

6. An apparatus for exchanging information between stations, said apparatus comprising at least one of a transmitter and a receiver exchanging said information via a transmission frame containing an information area, said information area including at least one data field and at least one control field, said at least one control field including a subfield representative of the validity of data transmitted in said at least one data field, said subfield being substantially at the staff of the information area, the transmission frame corresponding to an uplinik frame transmitted from a base transceiver station to a transcoder rate adaptation unit in a cellular mobile radio network, wherein said subfield representative of the validity of the data transmitted in said at least one data field comprises the first N bits of said information area and at least two respective predetermined combinations of said first N bits indicate the validity or non-validity of said data transmitted in said at least one data field.

7. A method of communicating between stations, comprising the steps of:
creating a transmission frame having an information area containing at least one data field and at least one control field;
placing in said at least one control field, at a location substantially at the start of said information area, a subfield indicating validity of data transmitted in said at least one data field; and
transmitting said transmission frame,
wherein said transmission frame corresponds to an uplink frame transmitted from a base transceiver station to a transcoder rate adaptation unit in a cellular mobile radio network
wherein the step of encoding said subfield comprises setting one of two states of a single bit, and said location for placing said subfield is the first bit in said information area.

8. A method of communicating between stations, comprising the steps of:
creating a transmission frame having an information area containing at least one data field and at least one control field;
placing in said at least one control field, at a location substantially at the start of said information area, a subfield indicating validity of data transmitted in said at least one data field; and
transmitting said transmission frame,
wherein said transmission frame corresponds to an uplink frame transmitted from a base transceiver station to a transcoder rate adaptation unit in a cellular mobile radio network,
wherein the step of encoding said subfield comprises setting one of two predetermined combinations of N bits, and said location for placing said subfield is the first N bits of said information area.

9. A transmitter in a mobile radio network for producing a transmission frame comprising an information area in the form of at least one data field and at least one control field, said at least one control field including a subfield representative of the validity of data transmitted in said at least one data field, the rank of the first bit of said subfield within said at least one control field being lower than 12, the number of bits of said subfield being higher than 1 or equal to 1, said transmitter including means for multiplexing said at least one data field and said at least one control field adapted to multiplex said subfield such that the rank of the first bit of said subfield within said at least one control field is lower than 12, wherein said subfield representative of the validity of the data transmitted in said at least one data field is in the form of a single bit taking one of two states and said bit is the first bit of said information area.

10. A transmitter in a mobile radio network for producing a transmission frame comprising an information area in the form of at least one data field and at least one control field, said at least one control field including a subfield representative of the validity of data transmitted in said at least one data field, the rank of the first bit of said subfield within said at least one control field being lower than 12, the number of bits of said subfield being higher than 1 or equal to 1, said transmitter including means for multiplexing said at least one data field and said at least one control field adapted to multiplex said subfield such that the rank of the first bit of said subfield within said at least one control field is lower than 12, wherein said subfield representative of the validity of the data transmitted in said at least one data field comprises the first N bits of said information area and at least two respective predetermined combinations of said first N bits indicate the validity or non-validity of said data transmitted in said at least one data field.

11. A receiver in a mobile radio network for receiving a transmission frame comprising an information area in the form of at least one data field and at least one control field, said at least one control field including a subfield representative of the validity of data transmitted in said at least one data field, the rank of the first bit of said subfield within said at least one control field being lower than 12, the number of bits of said subfield being higher than 1 or equal to 1, said receiver including means for demultiplexing said at least one data field and said at least one control field adapted to demultiplex said subfield the rank of the first bit of said subfield within said at least one control field is lower than 12, wherein said subfield representative of the validity of the data transmitted in said at least one data field is in the form of a single bit taking one of two states and said bit is the first bit of said information area.

12. A receiver in a mobile radio network for receiving a transmission frame comprising an information area in the form of at least one data field and at least one control field, said at least one control field including a subfield representative of the validity of data transmitted in said at least one data field, the rank of the first bit of said subfield within said at least one control field being lower than 12, the number of bits of said subfield being higher than 1 or equal to 1, said receiver including means for demultiplexing said at least one data field and said at least one control field adapted to demultiplex said subfield the rank of the first bit of said subfield within said at least one control field is lower than 12, wherein said subfield representative of the validity of the data transmitted in said at least one data field comprises the first N bits of said information area and at least two respective predetermined combinations of said first N bits indicate the validity or non-validity of said data transmitted in said at least one data field.

13. A system with transmits or receives a frame, the frame comprising an information area in the form of at least one data field and at least one control field, said at least one control field including a subfield representative of the validity of data transmitted in said at least one data field, characterised in that the rank of the first bit of said subfield in said at least one control field is less than 12, the number of bits of said subfield being greater than or equal to 1, wherein said subfield representative of the validity of said data transmitted in said at least one data field is in the form of a single bit taking one of two states and said bit is the first bit of said information area.

14. A system which transmits or receives a frame, the frame comprising an information area in the form of at least one data field and at least one control field, said at least one control field including a subfield representative of the validity of data transmitted in said at least one data field, characterised in that the rank of the first bit of said subfield in said at least one control field is less than 12, the number of bits of said subfield being greater than or equal to 1, wherein said subfield representative of the validity of the data transmitted in said at least one data field comprises the first N bits of said information area, and at least two respective predetermined combinations of states of said first N bits indicate the validity or the non-validity of the data transmitted in said at least one data field.

* * * * *